United States Patent
Lauridsen et al.

(10) Patent No.: US 7,743,103 B2
(45) Date of Patent: Jun. 22, 2010

(54) SYSTEM FOR HANDLING ELECTRONIC MAIL IN A MULTIPLE USER ENVIRONMENT

(75) Inventors: Anton Christian Lauridsen, Hellerup (DK); Henrik John Brandt, Copenhagen (DK)

(73) Assignee: Opportunity Solutions A/S, Hellerup (DK)

( * ) Notice: Subject to any disclaimer, the term of this patent is extended or adjusted under 35 U.S.C. 154(b) by 0 days.

(21) Appl. No.: 10/586,136

(22) PCT Filed: Aug. 31, 2005

(86) PCT No.: PCT/DK2005/000555
§ 371 (c)(1),
(2), (4) Date: Dec. 6, 2006

(87) PCT Pub. No.: WO2006/024300
PCT Pub. Date: Mar. 9, 2006

(65) Prior Publication Data
US 2007/0156819 A1 Jul. 5, 2007

(30) Foreign Application Priority Data
Aug. 31, 2004 (EP) .................................. 40477431

(51) Int. Cl.
*G06F 15/16* (2006.01)
(52) U.S. Cl. .............................. 709/206; 707/4; 707/10
(58) Field of Classification Search .................. 709/206
See application file for complete search history.

(56) References Cited

U.S. PATENT DOCUMENTS

| | | | |
|---|---|---|---|
| 6,230,156 B1 * | 5/2001 | Hussey | 707/10 |
| 6,438,582 B1 * | 8/2002 | Hsiao et al. | 709/206 |
| 6,615,241 B1 | 9/2003 | Miller et al. | |
| 7,149,733 B2 * | 12/2006 | Lin et al. | 707/4 |
| 7,194,516 B2 * | 3/2007 | Giacobbe et al. | 709/206 |
| 2003/0061209 A1 | 3/2003 | Raboczi et al. | |
| 2004/0088286 A1 * | 5/2004 | Hackleman et al. | 707/3 |
| 2004/0133645 A1 * | 7/2004 | Massanelli et al. | 709/206 |
| 2004/0199529 A1 * | 10/2004 | Clark et al. | 707/100 |
| 2006/0031357 A1 * | 2/2006 | Misra et al. | 709/206 |

OTHER PUBLICATIONS

Young et al. Microsoft® Office System Inside Out: 2003 Edition. Sep. 2003.*

* cited by examiner

*Primary Examiner*—Vivek Srivastava
*Assistant Examiner*—Vivek Krishnan
(74) *Attorney, Agent, or Firm*—Birch, Stewart, Kolasch & Birch, LLP (57) ABSTRACT

The invention concerns an electronic mail management (EMM) system for handling electronic mail in a multiple user environment, in which the user's incoming electronic mail is sent and received, said system includes a mail distribution network including a server through which. electronic mail items of the users are exchanged, said system comprising: detecting means for monitoring the flow of in- and outbound electronic mails for a specified set of users, and intercepting the in- and outbound emails; journalizing means for creating a notification record of a set of e-mail information data (metadata) for each intercepted electronic mail; an e-mail manager database (EMM DB) for storing at least said notification record and each electronic mail; and means for establishing a journal of e-mails by defining a search request query and submitting said search request to a search engine for selecting a userdefined series of information data from the notification records in the EMM database.

29 Claims, 3 Drawing Sheets

*Prior Art*

SYSTEM FOR HANDLING ELECTRONIC MAIL IN A MULTIPLE USER ENVIRONMENT

The present invention relates to a system and a method for handling electronic mail in a multiple user environment. Moreover, the invention relates to a computer-readable medium for implementing such system on a computer network.

In the recent decade, communication by electronic mail (e-mail) has been ever increasing. To an ever increasing extend, this e-mail correspondence is replacing the normal postal mail correspondence, not only personal private correspondence but also business related information is increasingly being exchanged via e-mail. Recent surveys show that as much as 60% of business related information and documents in a business office are distributed and stored as e-mails.

In many offices, an electronic mail system is installed in the computer network of the office and the members of staff are provided with their individual e-mail address and associated mailbox with which the individual persons send and receive their e-mails irrespective of the nature of the mail content.

In such an e-mail system, e-mails are sent and received via a mail server, which directs incoming mail to the mailbox of the registered user to whom the mail is sent. Thus, the mails are stored in the mailbox (database) of the dedicated users (recipients). The individual users are responsible for the storage and journalizing of the received e-mails, since the users have no access to the mailboxes of the other users, i.e. the colleagues. Much of the information communicated via e-mail is documentation, appointments, meeting schedules with colleagues and customers. Since e-mails containing such information can be accessed by the recipient only, this requires that the users must actively store and share his information so that the information is assessable for the organization, so that customer information and vital business documents and information are shared across the organization. Otherwise there is a considerable risk that vital information is lost which may have an adverse effect on the business. This risk is particularly present, if a member of staff leaves the organization or if data are stored on a lap top computer which breaks down. Though the data stored at each of the registered users, i.e. the individual members of staff in an organization, may be retrieved e.g. by an expert user, valuable time may have been lost.

In order to eliminate this risk of loosing information, various procedures may be introduced, however so far no reliable automatic system has been introduced.

Common between all the known technologies is that they deliver a central component called the "email post office". The email post office is a central place for storing emails—and the various players have built different feature sets around this.

Common for all the available systems is furthermore that emails received at the email post office is routed on to one or more private user mailboxes—just like normal paper mail would be handled at a normal post office.

The emails are then being read via an email "client" that is a piece of software that is compatible with the email post office software. As an example the most commonly uses email client is Microsoft "Outlook" and the most commonly used email post office is Microsoft "Exchange".

Unless the individual users specifically allow it, they can not see each others mailboxes. This makes true collaboration difficult and leaves company critical information in individual users' mailboxes—without proper central storage and security.

The net effect of the above is that all email correspondence of a specific user, is stored inside this users mailbox. The server will vigorously privacy protect the email stored inside the mailbox.

In other words, access to the contents of each mailbox is protected by the server, and access is only allowed on a per user basis.

In a modern day multi-user business environment, this privacy protection causes problems, since the partitioning function does not match actual business requirements. Business deals are made between companies, irrespective of the individual persons participating in the negotiations. Hence the need to look at emails stored inside other users mailboxes.

Users try to handle this situation by forwarding and cc'ing emails, thus increasing the load of emails which need to be handled.

Examples of mail management systems are known from U.S. Pat. No. 6,615,241 B1 and US 2003/0061209 A1. From U.S. Pat. No. 6,615,241 B1 a correspondent-centric email management system is known, where there is also a possibility that each client can establish a message-correspondent relationship. However, this does not reduce the load of emails which need to be handled in a multi-user environment, but merely automates the organization of the emails by correspondent for each of the individual user.

Therefore, the object of the present invention is to provide an automatic handling system for organizing e-mails in a multiple user environment.

By the invention it is realized that the root cause is actually that emails are stored and handled in a mailbox centric manner. The present invention suggests doing away with the mailbox completely.

Accordingly, the object is achieved by An electronic mail management system for handling electronic mail in a shared multiple user environment, in which the users' incoming electronic mail are sent and received from external correspondents, said system includes a common mail server with a central storage wherein electronic mail items of the users are stored and may be retrieved, said system comprising:

detecting means for monitoring the flow of in- and outbound electronic mails on the mail server for a specified set of users, and intercepting the in- and outbound e-mails;

journalizing means for creating a notification record of a set of e-mail information data (metadata) for each of the intercepted electronic mails;

an electronic mail manager database (EMM DB) for storing said notification records and the associated electronic mails in a relation database so that the notification records and the associated electronic mails are accessible for the users in the multiple users environment by a search query; and     means for establishing a journal of electronic mails from the notification records in the electronic mail management database by defining a search request query and submitting said search request to a search engine for selecting a user-defined series of information data from the notification records in the electronic mail management database.

By a system according to the invention, an electronic mail system for a multiple user environment is provided where an e-mail database is provided together with a search facility, so that electronic mail items are searchable independent of the server and client. The hitherto known technologies, such as Microsoft Exchange, Lotus Notes and Novell Groupwise, e-mails are received from various data sources, typically the Internet or the local LAN. The e-mails are delivered to one or more e-mail mailboxes. According to the e-mail management (EMM) system according to the present invention, this mailbox paradigm is no longer existing, since the received and sent e-mails are detected and delivered to the e-mail manager database and are actually not forwarded to the individual users mailboxes. Instead the individual users of the EMM system access the e-mails in the EMM database by performing a number of search queries. These search queries may be predefined as well as ad-hoc.

Although the traditional mailbox paradigm in reality does not exist in the EMM system according to the invention, the individual user may simulate this traditional mailbox by establishing a journal according to a predefined search in the EMM database. For instance, a search for e-mails in which the users own name is present in the data fields "To", "Cc" or "Bcc" of the notification record, the resulting journal is equal to the traditional inbox known in the traditional e-mail systems. Similarly, a "sent items" journal may be established.

However, the unique advantage of the e-mail management system according to the invention is that any type of journal may be established, irrespective of recipients or senders. As it may be appreciated, the EMM system according to the invention allows for an infinite number of ways of retrieving e-mails contrary to the traditional systems that only support one way of retrieving e-mails, i.e. direct delivery to a mailbox.

By the EMM system according to the present invention, the possibilities in the EMM system allows for a completely new mind shape within an organization, which may improve the output of the organization, such as customer service, productivity and profit margins, just as cooperation across departments within an organization may be facilitated.

For instance, by the EMM system it is possible to establish a journal containing all e-mail correspondence relating to a specific customer, a specific file number, a particular subject, etc. Hereby, users in a multiple user environment are not dependent on each other's presence in the organization in order to retrieve information, and the risk of failing to get all relevant information concerning a specific activity is eliminated or at least substantially reduced, e.g. because a colleague is on leave, has left the organization or has not shared the information by forwarding relevant e-mails with all relevant colleagues.

The difficulties in journalizing the mail by the traditional e-mail systems originate from the principle that received and sent e-mail is delivered to the individual mailboxes whereafter the mail is no longer accessible in the "post office" of the mail server. The traditional e-mail post office may be regarded as a routing mechanism rather than a database. This design of the traditional e-mail systems is historically based on a peer-to-peer communication where information typically is exchanged between two individuals. The mailbox idea is a basic design component by the traditional systems, but by the invention it is realized that this basic idea is preventing successful attempts to adapt e-mail systems to IT collaboration systems where information is archived and journalized and made accessible for a multiple of users.

The storage of e-mails in an EMM system according to the invention offers many advantages as described above. It is also realized that it is advantageous to provide a sufficiently large storage capacity so that no e-mails needs to be deleted due to lack of storage space in the central server in the organization. The needed storage space is also minimized as only one copy of an e-mail needs to be stored, even if it is sent to a multiple of recipients. By not providing a delete function in the EMM system, a unique complete electronic mail documentation is provided for the organization having an EMM system according to the invention installed.

In an embodiment of the system according to the invention, the detection means include means for formatting each intercepted electronic mail. Moreover, this formatted electronic mail is copied to the e-mail manager database (EMM DB). Hereby, the e-mails are stored in the database in a searchable format.

Preferably, the EMM database is a relation database, preferably hosted on a SQL server. Hereby, a searchable database structure is provided facilitating the journalizing means of the EMM system according to the invention.

The data in the notification record includes a notification message for each e-mail, said notification message is preferably containing e-mail header information data including at least one of the following data:

time of receipt (date);
information concerning the sender ("from");
information concerning the recipient(s) ("to");
information regarding copy recipients ("cc");
blind copy recipients ("bcc");
message identification;
reference data, such as "in reply to";
subject;
comments, and
keywords.

These "metadata" in the notification message are stored in the EMM database, so that the e-mail to which the notification record is attached is easily identifiable and thereby retrievable.

Preferably, the EMM is adapted to cooperate with any SMTP protocol based e-mail systems. Hereby, the EMM system according to the invention may be implemented on existing systems as an "add-on" module to a traditional e-mail system.

The specified set of users being subjected to the detection means is preferably all users in the multiple user environment, which may be at least two users. By encompassing all users, i.e. all clients to the server, a comprehensive journalisation of all e-mails may be ensured.

It is realized that the multiple-user environment may be a multi-site customer environment; each site having a local client server or the multiple-user environment may be a single-site customer environment, having a single client server.

Preferably, the means for establishing a journal include an e-mail management dialog means for each user for indicating arrival and departure of e-mails. By this dialog means (toaster) interaction between the user and the EMM system may be conducted and a flag is set for the user indicating an e-mail to be journalised. By the term journalising is meant an operation, where the user is deciding if an e-mail is to be available for a search result or not. The dialog means may provide for seeking the user's consent for journalising for each arriving and departing e-mail. The dialog means may include a notification scheduler having means for updating the journalising means, said updating means include a predefined journalisable acceptance criterion. This journalisable acceptance criterion is either if the specific e-mail is sent to more users, all users must accept the specific e-mail to be journalised; or if only one of the users accepts the specific e-mail for journalising, the journalising is performed.

In an alternative embodiment, the dialog means may provide for automatic journalising for each arriving and departing e-mail.

In a preferred embodiment of the invention, a multiple of journals may be established, and a combined journal may be established by comparing two or more of said multiple of journals by Boolean operators.

The invention also concerns a method of managing e-mails in a multiple-user environment on a system as described in the first aspect of the invention. In a third aspect of the invention, a non-transitory computer-readable medium containing a computer-readable program code for manipulating computer means for enabling a computer system to perform the method of managing e-mails according to the invention and thereby implementing an EMM system according to the invention on the computer system.

In stead of passing emails from the post office into individual mailboxes, all emails are placed in a central email store. This means that every email that a company receives—irrespective of the recipients—is placed in the central store. Likewise, every email any user sends is placed in the store.

A user can then perform searches across the entire email store—to gain a quick and exact overview of the entire email dialog with e.g. a specific customer. Depending of how the invention is implemented, the search result could be displayed as a folder in the email client, inside an ERP system, inside a CRM system, etc.

A search like this is often referred to as information "pull". An implementation of the invention could also offer information "push", so that information is provided to the user without user interaction. This could e.g. be a user that has asked the email store to inform him/her if emails are received from or sent to a specific account.

Several surveys indicate that email is not only the preferred way to communicate with customers—email also contains business critical information.

With the invention organizations can avoid
Inability to comply with governmental regulations
Financial risks due to inability to produce documentation
Excessive time consumption tracking emails
Lack of true team collaboration
Unsatisfied customers due to lack of coordination
Excessive use of CC mails
And furthermore give them benefits, such as
Compliance with public regulations
Easy access to the customer dialog
Automatic email handling, both in- and outbound
Effective and easy customer management
Fast knowledge transfer when colleagues leave
Time to concentrate on business.

With the invention, it would still be possible to "emulate" a mailbox—allowing support for existing email client software and working patterns.

The inbox for hbrandt@oppsol.com could—as an example—be emulated with the following search in the email store (pseudo SQL syntax):

```
BEGIN
SELECT * FROM EMM_DATABASE WHERE
TO_FIELD CONTAINS "hbrandt@oppsol.com"
SELECT * FROM EMM_DATABASE WHERE
CC_FIELD CONTAINS "hbrandt@oppsol.com"
SELECT * FROM EMM_DATABASE WHERE
BCC_FIELD CONTAINS "hbrandt@oppsol.com"
SORT BY DATE
END
```

This search would list all the emails where "hbrandt@oppsol.com" is displayed in the TO, CC or BCC fields of the email—i.e. just like an inbox looks like today.

Cross-mailbox searches in traditional email post office systems are virtually impossible to perform. This makes true collaboration and central email storage a huge challenge.

By the present invention these issues are solved and the email management system according to the invention.

In the following the invention is further described with reference a preferred embodiment of the invention and with reference to the accompanying drawings, in which.

Figure 1:
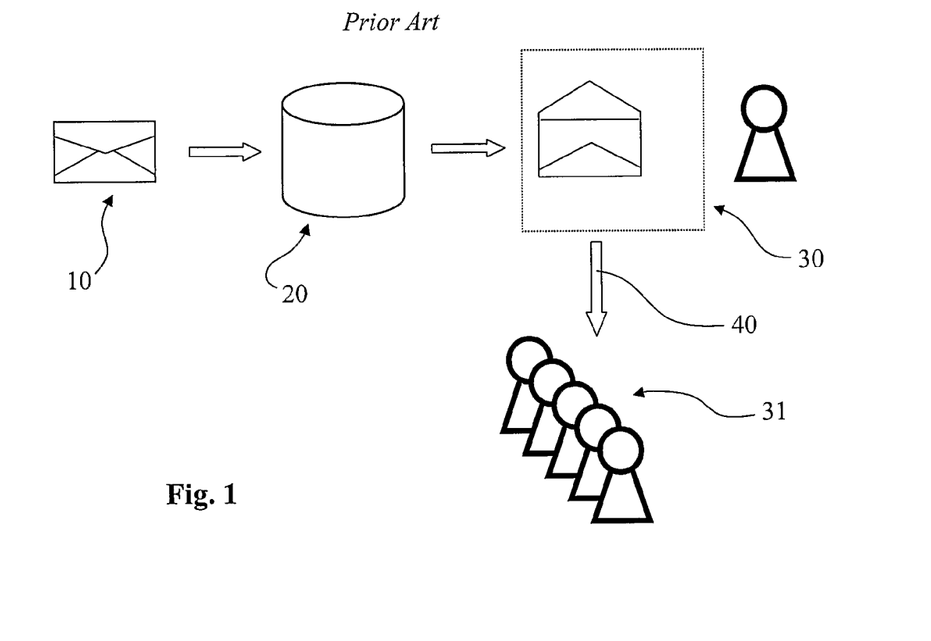
FIG. 1 is a principle drawing of a traditional mail system.

As shown in FIG. 1, in a traditional mail system in an organization having a multiple of users, an electronic mail item 10 is received and stored in an allocated storage space 20 of the recipient. The mail is shown in the recipient's inbox 30, where the mail may be read and forwarded (see arrow 40) to other members 31 of the organization. If the mail item is not forwarded, the other members 31 cannot access the information in the mail.

Figure 2:
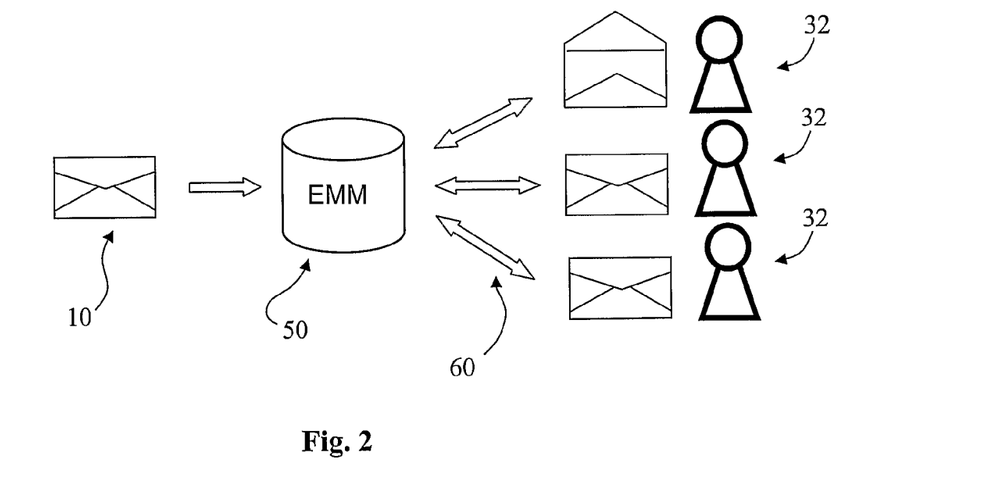
FIG. 2 is a principle drawing of a mail system according to the invention.

As principally shown in FIG. 2, this problem is overcome with a mail handling system according to the invention. As shown in FIG. 2, the incoming mail 10 is stored in an electronic mail management database 50 (EMM DB). In this EMM database 50 it is possible to perform a dynamic search 60, whereby the users having access to the computer network in the organization may gain access to relevant information communicated to any member 32 of the organization in an electronic mail. A search structure is defined, so that at the workstations in the computer network, the users may define search query and retrieve all e-mails complying with the user-determined criteria defined in this search query.

The search queries may include both sent and received e-mails to/from the mail addresses of the users on the computer network. Detection means (ECA) captures all incoming and outgoing e-mails on the exchange server. A notification record is created including a set of metadata by journalizing means (EMP) for each mail. Said notification records are stored in the EMM database.

The EMM (E-Mail Management) application according to the invention monitors the Exchange server in a computer network for incoming and outgoing e-mails for a specified set of users, e.g. all users on the server. The monitored e-mails are stored inside a central database. While performing the save of an e-mail, a notification is also sent to the logged in EMM user's display system indicating the arrival/departure of the e-mail and seeking the user's consent for journalizing. Based on the response of the EMM user, the e-mail is journalized. The EMM user's failing to respond to their notification displays within a predefined window may be stored in the work queue in the EMM store. The user can access the work queue through the display and can journalize the e-mails at a later convenient period of time.

To facilitate the understanding of the present invention, a theoretical background explanation is provided in the following:

Definitions:

An email can be described as a tupple, containing:

[s,r,d,m]                                                                                                         (1.1)

Where s is a set of sender e-mail addresses, r is a set of recipient e-mail addresses, d is a set of additional header (envelope) data and m is the actual message.

Email addresses can have a number of different formats, for the purposes of this document, we assume that they are formatted as strings of characters according to the rules outlined in RFC 2822 (http://http://www.faqs.org/rfcs/rfc2822.html). RFC 2822 distinguishes between, TO:, CC: and BCC: recipients, for the purposes of this invention, we consider r to be a union of the three sets of e-mail addresses. The set A is defined as the set of all possible email addresses known, e.g. RFC 2822 formatted email addresses.

So:

$$s \subset A \text{ and } r \subset A$$

The set d, contains any additional envelope information, like: sent date, server path, etc. as specified in RFC 2822 as header fields. The set D is defined as the set all of possible envelope information, e.g. the list specified by RFC 2822.

So:

$$d \subset D$$

The element m, can contain any kind of message, for the intents of this document, the format is inconsequential, it is assumed to be a sequence of characters, formatted directly according to RFC 2822 or the RFCs governing MIME formatted e-mails (RFC 2045, RFC 2046, RFC 2048, RFC 2049). The set M is defined as the set of messages which can be defined via the above RFCs.

So:

$$m \subset M$$

A traditional email server system performs two major operations, it either sends e-mails, or receives e-mails. A number of protocols for handling these operations exist. The most popular are the ones defined by IETF.

Primarily SMTP (RFC 2821/RFC 2822), POP3 (RFC 1939), IMAP (RFC 2060) are used for dealing with e-mails and transmission of e-mails. The protocols can be roughly divided into two different groups, central mail reception and delivery of email to users. SMTP is responsible for receiving e-mails centrally, and store these in a database. POP3 and IMAP are protocols used to retrieve emails from the central database. The actual protocols used are not important to this invention.

The important thing to note is that conventionally all e-mails are considered user centric, i.e. an e-mail is considered analogous to a traditional postal mail. It is received by the receiving agent (SMTP), stored and privacy protected. This privacy protection is handled via a mailbox metaphor. I.e. the email is assigned to one or more mailboxes and access to the mailboxes are considered a privileged action, which requires at least password validation.

Consequently an email server, will upon reception of an email, examine the set of recipients, and assign the email to a number of mailboxes according to a list of known mailboxes.

Similarly sending an email will cause the sent email to be stored in the mailbox of the sender.

Consequently an email server can be describes as a tuple [e,b] where e is the set of emails stored on the server and b is the set of mailboxes. The mailboxes can be seen as a partitioning of the set of email, where $b \subset e$, note the partitioning is not perfect, thus the equation $$\bigcap_{i=1}^{n} b_i = \varnothing$$

is not satisfied.

The net effect of the above is that all email correspondence of a specific user, is stored inside this users mailbox. The server will vigorously privacy protect the email stored inside the mailbox.

In other words access to the contents of each $b_i$ is protected by the server, and access is only allowed on a per user basis.

In a modern day multi user business environment, this privacy protection causes problems, since the partitioning function does not match actual business requirements. Business deals are made between companies, irrespective of the individual persons participating in the negotiations. Hence the need to look at emails stored inside other users mailboxes.

Users try to handle this situation by forwarding and cc'ing emails, thus increasing the load of emails which need to be handled.

The root cause is actually that emails are stored and handled in a mailbox centric manner. This invention suggests doing away with the mailbox completely.

Once the mailbox has been removed from the server reception and sending of emails are significantly simplified, as there are no considerations regarding assignment to mailboxes.

Viewing the relevant emails is however made more complicated. Traditionally a mailbox not only serves the purpose of privacy protection, but it also functions as a static filtering mechanism, for reducing the volume of emails a user is presented with.

Consequently a new filtering mechanism must be introduced.

We propose that a better server configuration would be [e, j], where e again is the corpus of emails on the server, but j is no longer a static entity, but describes a set of dynamic queries.

This invention suggests querying the database dynamically, based upon search criteria, matching any of the attributes described in (1.1). The proposed query language is analogous to SQL, and allows queries like:

SELECT * FROM emails WHERE RECEIVED_DATE BETWEEN (@ Today, @ LastMonth) AND SUBJECT IS LIKE '% Delgano project %'

The above query would return all mails, regardless of sender and recipient, from within the last month, which is relevant for a projects named Delgano.

Based upon the names of columns: RECEIVED_DATE, SUBJECT, etc. the query engine will search either of the elements of the tuple in (1.1).

Some queries will be preformed so frequently as to make it viable to store permanently. These permanently stored queries are being defined as journals.

We realize that a number of users will be hesitant to embrace a new email paradigm where, the traditional mailbox does not exist, like wise server administrators will be hesitant to install a new email infrastructure server, consequently a number of migratory devices must be implemented.

First it is important to note that the traditional mailbox can be emulated, by storing a journal, having the following search query:

```
SELECT * FROM emails WHERE   TO CONTAINS
                               '<useremailaddress>' OR
                             CC CONTAINS
                               '<useremailaddress>' OR
                             BCC CONTAINS
                               '<useremailaddress>' OR
                             FROM CONTAINS
                               '<useremailaddress>'
```

Creating a journal for each user, containing the above query will satisfy the end users reluctance of giving up his/her personal mailbox, since for all intents and purposes, he does still have a mailbox.

Consequently a users request for emails from the server can be seen as evaluating the function:

$$f([e, j], q) = \begin{cases} \{a \in e | g(a, j_q) = 1\}, \text{ where } q \in N \\ \{a \in e | g(a, q) = 1\}, \text{ where } q \notin N \end{cases}$$

i.e. if q is a natural number it is used as an index into the set of predefined queries, otherwise q is assumed to be and ad hoc query. The function g is an indicator function, which returns 1, if the a matches the search criteria specified, otherwise it return 0.

A server administrator will need assurances that his mail servers will continue to operate, irrespective of this new system being used. Hence the need for a sniffer, which will continuously monitor the e-mail server for email traffic, at snapshot the email data onto the EMM system.

Figure 3:
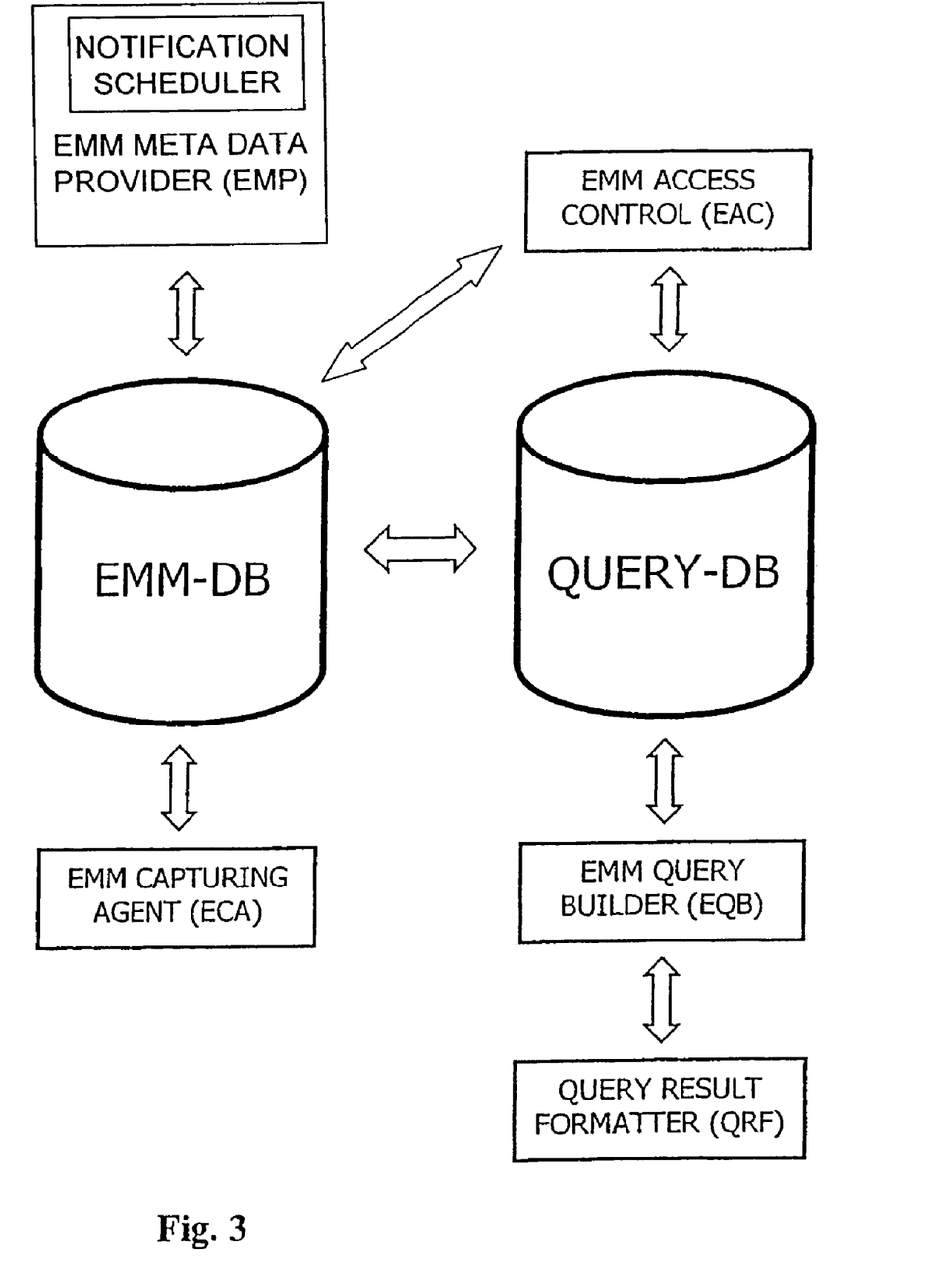
FIG. 3 is a schematic architectural drawing of an electronic mail management system according to a preferred embodiment of the invention.

With reference to FIG. 3, the sub-systems of an e-mail manager (EMM) according to the preferred embodiment of the invention are schematically described.

Data Stores:

At the core of the EMM are the two data stores:
1. EMM-DB. This is the main data store. The EMM-DB contains all emails received from the ECA. The EMM-DB furthermore contains all metadata created by an application that uses the EMM.
2. QUERY-DB. This is the data store that contains the predefined and ad-hoc created EMM queries. Predefined queries could be Inbox simulation queries. Ad-hoc queries could be a request for all emails from/to a specific customer.

The two data stores can easily reside on the same physical server—and preferably in a SQL environment.

EMM Access Control (EAC):

The EAC is an environment specific security mechanism that grants/denies specific EMM users access to items in the EMM-DB and QUERY-DB. This will allow for protection of confidential information. In a Microsoft environment, the EAC will be an extension to Active Directory (AD).

EMM Capturing Agent (ECA):

The ECA is responsible for capturing emails from the email source and storing them in the EMM-DB. An email source could be a general purpose e-mail system such as Microsoft Exchange, Lotus Notes or Novell GroupWise. The email source could also be a direct SMTP (Simple Mail Transport Protocol) source.

EMM Meta Data Provider (EMP):

The EMP is an environment specific application that adds metadata to the emails in the EMM-DB.

EMM Query Builder (EQB):

The EQB is an environment specific application for creating predefined and ad-hoc queries.

Query Result Formatter (QRF):

The QRF is an environment specific application that displays the result of a query from the QUERY-DB against the EMM-DB. The QRF may display the result as a folder in the users email application (such as Microsoft Outlook), as a web page, as a data list in a spreadsheet, as an extension to an ERP system (such as Microsoft Navision), as an extension to a CRM system (such as Microsoft CRM), on a mobile device, etc.

Figure 4:
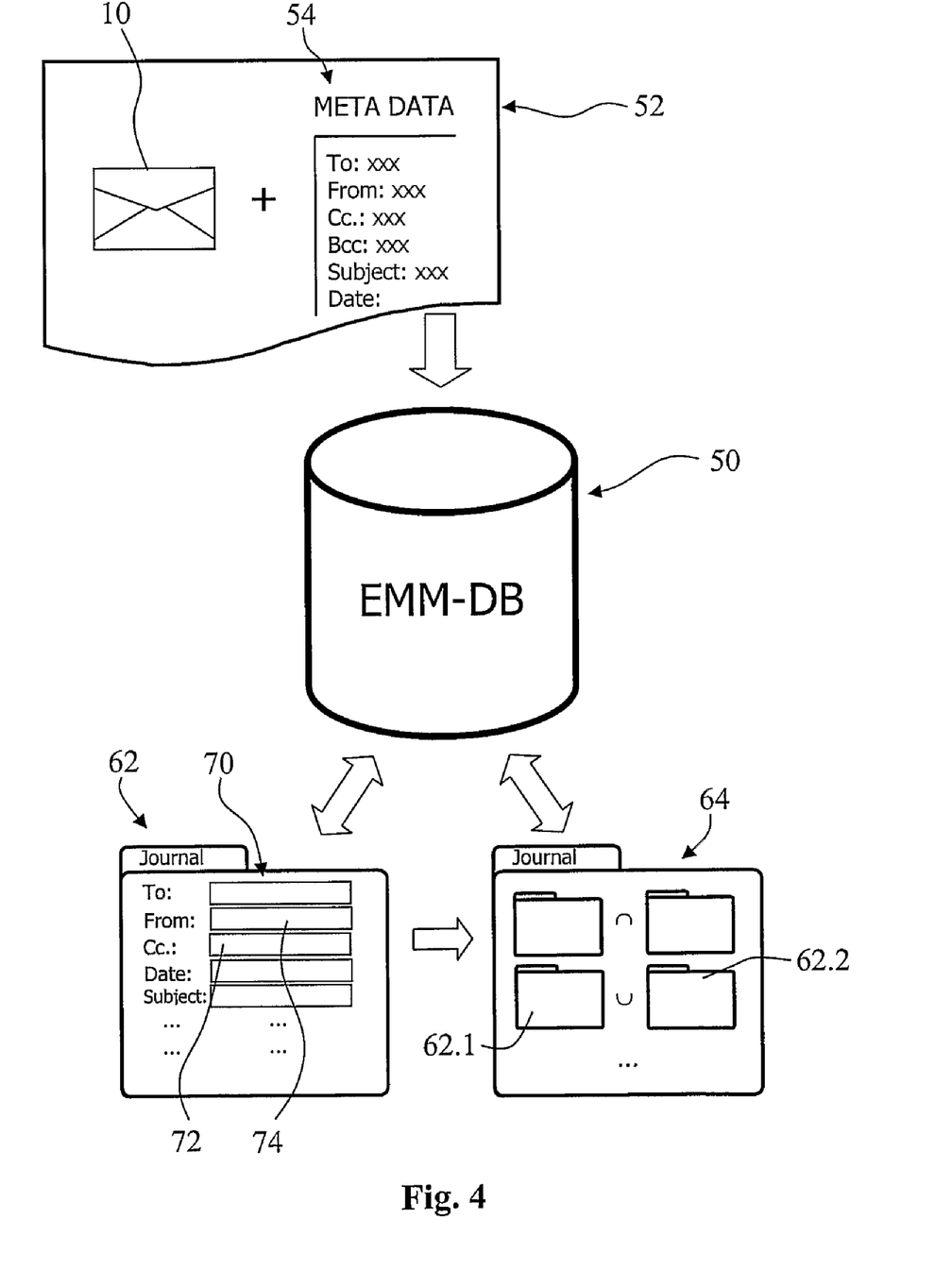
FIG. 4 is a schematic drawing of an electronic mail management system according to a preferred embodiment of the invention.

Referring to FIG. 4, a notification record 52 includes an e-mail 10 and a set of associated metadata 54. This notification record 52 is stored in the EMM database 50. By the content of the metadata 54, the e-mail 10 is searchable and may be selected in a user-defined journal 62. A user-specified journal 62 may be established by defining a search query 70 including one or more search criteria 72, 74. The search criteria may be compared with any type of Boolean operator, e.g. "and", "or", "and not".

A second journal 64 may be established by comparing two or more searches 62.1; 62.2 to form a new journal 64. In this manner, the dynamic search facilities allow the user to perform advanced searches for relevant e-mails in the EMM database.

The storage of e-mails in an EMM system according to the invention offers many advantages as described above. It is also realized that it is advantageous to provide a sufficiently large storage capacity so that no e-mails needs to be deleted due to lack of storage space in the central server in the organization. The needed storage space is also minimized as only one copy of an e-mail needs to be stored, even if it is sent to a multiple of recipients. By not providing a delete function in the EMM system, a unique complete electronic mail documentation is provided for the organization having an EMM system installed.

The invention claimed is:

1. An electronic mail management system for handling electronic mail in a shared multiple user environment, in which the users' incoming electronic mail are sent and received from external correspondents, said system includes a common mail server with a central storage wherein electronic mail items of the users are stored and may be retrieved, said system comprising:
    detecting means for monitoring the flow of in- and outbound electronic mails on the mail server for a specified set of users, and intercepting the in- and outbound e-mails;
    journalising means for creating a notification record of a set of e-mail information data for each of the intercepted electronic mails, wherein the users can decide if intercepted electronic mails are to be available for a search query, whereby electronic mails are journalized and shared between a multiple of users;
    an electronic mail manager database (EMM-DB) for storing said notification records and the associated electronic mails in a relation database so that the notification records and the associated electronic mails are archived and made accessible for the users in the multiple users environment by a search query;
    a query builder (EQB) for creating predefined and ad-hoc search queries that can be applied/submitted to the EMM-DB, wherein a search query is selecting a user-defined series of information data from the notification records in the electronic mail management database irrespective of recipients or senders of said electronic mails;
    a query database (QUERY-DB) for storing said predefined and ad-hoc search queries;
    user access means for providing all users access to queries in the QUERY-DB and electronic mails in the EMM-DB, whereby the electronic mails are searchable independent of senders and recipients; and
    access control means (EAC) for defining user access rights to queries in the QUERY-DB and electronic mails in the EMM-DB.

2. The system according to claim 1, wherein the detection means includes means for formatting each intercepted electronic mail.

3. The system according to claim 2, wherein the detection means further include means for copying the formatted electronic mall to the electronic mail manager database (EMM DB).

4. The system according to any of claims 1 to 3 wherein electronic mail management relation database and the query database are hosted on a SQL server.

5. The system according to claim 1, wherein creation of a predefined search query involves a search according to at least one selection criterion in the notification record for establishing a journal of e-mails among the entries in the electronic mail management database.

6. The system according to claim 5, wherein the data in the notification record includes a notification message for each e-mail, said notification message containing e-mail header information including at least one of the following data: time of receipt (date); information concerning the sender ("from"); information concerning the recipient or recipients ("to"); information regarding copy recipients ("cc") and/or blind copy recipients ("bcc"); message identification; reference data, such as "in reply to"; subject; comments, and keywords.

7. The system according to claim 1, wherein said electronic mail management system (EMM) is adapted to cooperate wit any SMTP protocol based e-mail systems.

8. The system according to claim 1, wherein the specified set of users being subjected to the detection means is all users in the multiple user environment is at least two users.

9. The system according to claim 1, wherein the multiple-user environment is a multi-site customer environment, each site having a local client server.

10. The system according to any of claim 1, wherein the multiple-user environment is a single-she customer environment, having a single client server.

11. The system according to claim 1, wherein the journalising means include an e-mail management dialog means for each user for indicating arrival and departure of e-mails and for indicating an e-mail to be journalized.

12. The system according to claim 11, wherein said dialog means provide for seeking consent for journalising for each arriving and departing e-mail.

13. The system according to claim 11, wherein said dialog means provide for automatic journalising for each arriving and departing e-mail.

14. The system according to claim 1, wherein the journalising means includes:
a notification scheduler, and
the electronic mail manager database.

15. The system according to claim 14, wherein the notification scheduler includes means for updating the journalising means, said updating means include a predefined journalisable acceptance criterion.

16. The system according to claim 15, wherein said journalisable acceptance criterion being either if the specific e-mail is sent to more users, all users must accept the specific e-mail to be journalised, or if only one of the users accepts the specific e-mail for journalising, the journalising is performed.

17. The system according to claim 1, wherein the query builder is adapted for creating a multiple of search queries.

18. The system according to claim 17, wherein a combined search query is established by comparing two or more of said multiple of search queries by Boolean operators.

19. A method of journalsing electronic mail in a shared multiple user environment, in which the users' incoming electronic mail are sent and received from extenal correspondents, said system includes a common mail server with a central storage wherein electronic mail items of the users are stored and may be retrieved, said method comprising:
monitoring the flow of in- and outbound electronic mails on the mail server to and from the server users, and intercepting at least a selection of the in- and outbound e-mails,
creating a notification record of a set of e-mail information data for each intercepted electronic mail and providing that the users can decide if intercepted electronic mails are to be available for a search query, whereby electronic mails are journalized and shared between a multiple of users;
storing said notification records and the associated electronic mails in an electronic mail manager database (EMM-DB) so that the notification records and the associated electronic mails are archived and made accessible for the users in the multiple users environment by a search query;
creating predefined and ad-hoc search queries by a query builder (EQB), said search queries can be applied/submitted to the EMM-DB and wherein a search query is selecting a user-defined series of information data from the notification records in the electronic mail management database irrespective of recipients or senders of said electronic mails;
storing said predefined and ad-hoc search queries in a query database (QUERY-DB);
providing all users access to queries in the QUERY-DB and electronic mails in the EMM-DB. whereby the electronic mails are searchable independent of senders and recipients; and
defining user access rights to queries in the QUERY-DB and electronic mails in the EMM-DB by access control means (EAC).

20. The method according to claim 19, including formatting each intercepted electronic mail.

21. The method according to claim 20, wherein said formatted electronic mail is copied to the e-mail manager database (EMM DB).

22. The method according to claim 19, wherein the step of journalizing includes an e-mail management dialog means for each user for indicating arrival and departure of e-mails and for indicating an e-mail to be journalized.

23. The method according to claim 22, wherein said dialog means provide for seekng consent for journalising for each arriving and departing e-mail.

24. The method according to claim 22, wherein said dialog means provide for automatic journalising for each arriving and departing e-mail.

25. The method according to claim 1, wherein the e-mail journalising step include updating the journalising means, said updating means include a predefined journalisable acceptance criterion.

26. The method according to claim 25, wherein said journalisable acceptance criterion is either if the specific e-mail is sent to more users, that all users must accept the specific e-mail to be journalised, or if only one of the users accepts the specific e-mail for journalising, the journalising is performed.

27. The method according to claim 19, wherein the step of creating a search query is adapted for creating a multiple of search queries.

28. The method according to claim 27, wherein a combined search query is established by comparing two or more of said multiple of search queries by Boolean operators.

29. A non-transitory computer-readable medium having computer-readable program code means providing an e-mall management system for journalising electronic mail in a shared multiple user environment, in which the users' incoming electronic mail are sent and received from external correspondents, said system includes a common mail server with a central storage wherein electronic mail items of the users are stored and may be retrieved, said computer-readable program code comprising:

computer program code means for providing detecting means for monitoring the flow of in- and outbound electronic mails on the mail server to and from the server users, and intercepting at least a selection of the in- and outbound e-mails;

computer program code means for providing journalising means for creating a notification record of a set of e-mail information data for each intercepted electronic mail wherein the users can decide if intercepted electronic mails are to be available for a search query, whereby electronic mails are journalized and shared between a multiple of users;

computer program code means for storing said notification records and the associated electronic mails in an electronic mail manager database (EMM-DB) for storing at least said notification record and each electronic mail in a manner accessible for the users in the multiple users environment, so that the notification records and the associated electronic mails are archived and made accessible for the users in the multiple users environment by a search query;

computer program code means for creating predefined and ad-hoc search queries by a query builder (EQB), said search queries can be applied/submitted to the EMM-DB and wherein a search query is selecting a user-defined series of information data from the notification records in the electronic mail management database irrespective of recipients or senders of said electronic mails;

computer program code means for storing said predefined and ad-hoc search queries in a query database (QUERY-DB);

computer program code means for providing all users access to queries in the QUERY-DB and electronic mails in the EMM-DB, whereby the electronic mails are searchable independent of senders and recipients; and computer program code means for defining user access rights to queries in the OUERY-DB and electronic mails in the EMM-DB by access control means (EAC).

* * * * *